Patented Feb. 14, 1939

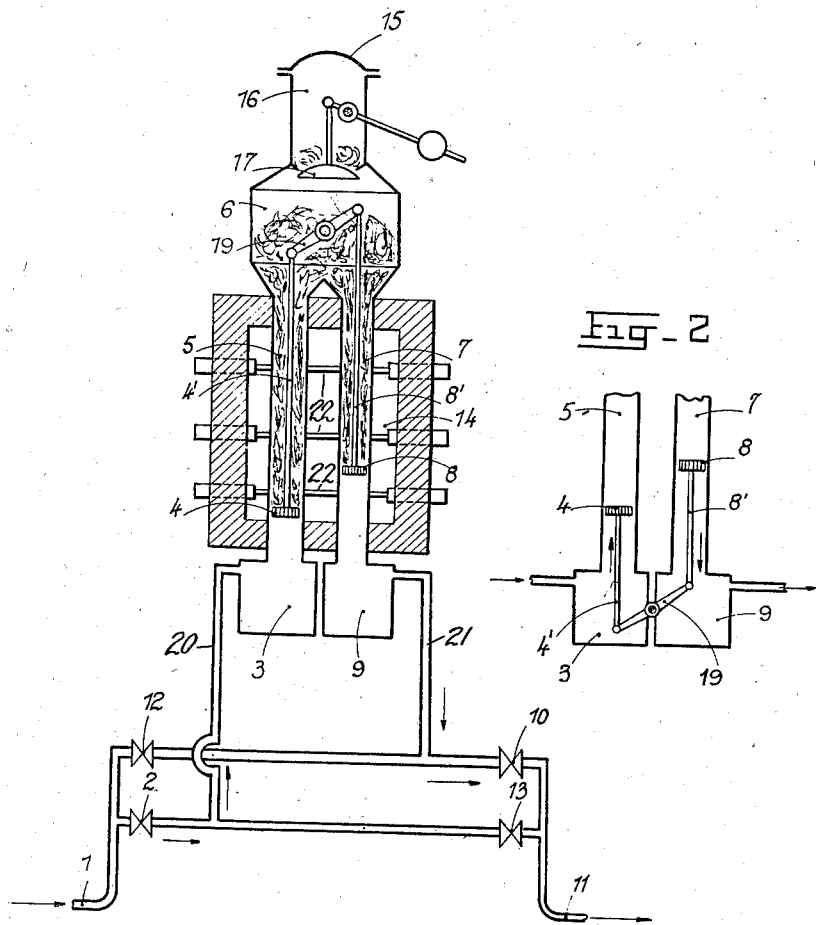

2,147,551

UNITED STATES PATENT OFFICE 2,147,551

APPARATUS FOR THE TREATMENT OF GAS

Leon Saives, Billancourt, France, assignor to Louis Renault, Billancourt, France Application September 9, 1936, Serial No. 100,053
In France July 11, 1936

1 Claim. (Cl. 23—277)

This invention relates to an apparatus for the preparation of gas, in particular for the production of cementation or case-hardening gas. In actual practice, it has been recognized that, in order to obtain a correct gaseous cementation, it is desirable to have available a gas consisting of carbon monoxide, hydrogen and nitrogen and which may contain methane. In order to obtain suitable results such a gas should be practically free from water vapour, carbon dioxide and free oxygen. It has also been recognized that it is advantageous for this gas to be as rich as possible in carbon monoxide and in hydrogen.

The gases obtained by the usual processes are, poor gas, mixed gas or water gas. The term "poor gas" relates to a mixture resulting from the passage of air over hot coal and contains practically no hydrogen and consists principally of carbon monoxide. The expression "mixed gas" pertains to a mixture resulting from the alternate passages of air and water vapor on hot coal so that the gas contains chiefly CO, $CO^2$ and hydrogen. The term "water gas" is intended to relate to the mixture obtained from the passage of water vapor on hot coal and such a gas also contains CO, $CO^2$ and hydrogen but the quantity of H is greater than that present in mixed gas. The quantity of $CO^2$ present in water gas is also less than that present in mixed gas. Such gases are unsuited for gaseous cementation or case-hardening.

The apparatus forming the subject of the present invention permits of obtaining a suitable gas by reaction with carbon. The carbon dioxide is converted into carbon monoxide; the oxygen combines with carbon to form carbon monoxide, the water vapour reacts with carbon to form hydrogen and carbon monoxide. By suitably arranging the apparatus and adjusting the temperature, there remains no trace of injurious gases.

It would be natural to suppose that a suitable gas could be obtained by causing the gas from the producer to pass through a column filled with carbon and kept incandescent by an external heating device. For convenience in filling the tube or furnace, the use of a vertical arrangement would be a natural choice, the coal being introduced at the upper part and the ashes removed from the lower part. Experience has shown that such a device cannot operate without numerous disadvantages.

If for example the gas to be converted is supplied through the lower part, the reaction gas which escapes at the upper part contacts with the fresh coal and removes moisture therefrom. Furthermore, in consequence of the reduced temperature at the outlet of the tube, there occurs dissociation of the carbon monoxide in contact with the coal resulting in the formation of carbon dioxide. The gas thus obtained is not suitable for cementation or case-hardening.

If, on the contrary, the gas to be converted is supplied through the upper part and if the gaseous reaction product passes out through the lower part under the furnace grating, a difficulty is overcome. The fresh gas, in fact, reacts with the coal in the upper part of the furnace while in the lower part the carbon is unchanged since it is in equilibrium with the converted gas. Under these conditions, the ashes accumulate in the central portion of the furnace and can only escape through the ash-pit by causing a considerable loss in unburnt matter. Furthermore, the mixture of ashes and coal over the whole height of the column no longer permits of a regular composition of the gas being obtained and causes a considerable reduction in production.

The invention is illustrated by way of example in the accompanying drawing which shows one embodiment of the apparatus:

Figure 1 is a vertical section,

Figure 2 shows a variation in the control of the gratings.

The gas to be converted is introduced through the pipe 1, and passes through the open valve 2 and then into the ash-pit 3 by means of the pipe 20 whence it rises through the grate 4 into the tube 5 where it reacts with the contained carbon and then passes into the hopper 6, and from there descends into the tube 7, through the grate 8, the ash-pit 9, a pipe 21, the open valve 10, finally to pass into the outlet pipe 11. The reaction tubes 5 and 7 are arranged within a furnace 14 heated by any suitable means such as electrical heating elements, or by combustion of gas or oil fuel.

Under these conditions, the water vapour arising from the fresh coal contained in the hopper 6 is decomposed by passing through the incandescent column contained in the tube 7. The grate 8 is placed at a sufficient height, that is to say, such that it attains a suitable temperature to avoid any dissociation of the carbon monoxide and consequently any trace of carbon dioxide. The greater part of the reactive carbon is located at the lower part of the tube 5 and in the vicinity of the grate 4 through which the fresh gas arrives. Under these conditions, the ashes are easily evacuated through the grate 4 into the ash-pit 3.

At the end of a certain operating period, the slight reaction which takes place in the tube 7 results in a progressive exhaustion of the coal, the body of which becomes ashes. To avoid a resulting defective operation, the direction of flow of the gas is changed at suitable time intervals, by closing the valves 2 and 10 and opening the valves 12 and 13. Under these conditions the gas circulates in the following order: 1—12—21—9—8—6—5—4—3—20—13—11.

To permit of the discharge of the ashes, the apparatus may be provided with a device for rocking the grates 4 and 8 which may be effected by means of two rods $4^1$ and $8^1$ and an oscillating lever 19. The rods $4^1$ and $8^1$ may be located as shown in Fig. 2, below the grates and extended upwardly. In this case the grate operating mechanism is not subjected to the high temperature of the furnace. The rocking lever 19 may, as shown in Figure 1, be arranged in the chamber or hopper 6 with the two rods $4^1$ and $8^1$, extending downwardly to respectively support each grating 4, 8. The rods thus pass through the entire column of coal and being subjected to a high temperature in the central region they may be made of special steel.

Experience has shown that these two methods of mounting the grates give excellent results.

The rocking lever 19 is inclined in such manner that the grate 8 located on the side at which the gas normally emerges is placed in a region of high temperature and the grate 4 located at the inlet side of the gases is placed in a zone of moderate temperature. Under these conditions, the maximum efficiency of the furnace is obtained. The inclination of the rocking lever thus depends upon the direction of circulation of the gas and must be reversed at the time the circulation of the gases is changed. If between two periods of reversal ashes can be removed, the rocking lever may be oscillated either in a continuous manner by slight oscillations about the correct position or in an intermittent manner. After the ash-removal operation the rocking lever should be stopped in the correct position.

The tubes 6 and 7 are preferably metal formed of special steel which resists high temperatures and oxidation, and is not attacked by carbon monoxide. Accordingly, the tubes may be made of steel containing 20 to 30% chromium with suitable additions of silicon, aluminium, nickel, etc.

The apparatus for charging the coal is a known type of the double closing type with cone and cover as usually employed for gas producers. In Figure 1 there is shown a charging head 16 with lower cone 17 and upper cover 15.

Starting with gas from a gas producer using wood fuel and containing as injurious impurities:

Carbon dioxide: 7 to 12%
Oxygen: 0.2 to 1%
Water vapour: 1 to 2% the gas, after passing into the furnace of wood charcoal, then contains 0.2 to 0.3% of carbon-dioxide and no trace of water vapour, when the temperature of the furnace is 980° centigrade. At a higher temperature the carbon dioxide content falls rapidly to absolutely negligible values. As soon as the temperature of the furnace exceeds a temperature of the order of 950–960° centigrade, the gas becomes suitable for cementation and perfect results are attained as soon as the temperature is between 980° and 1020° centigrade. These temperatures may easily be obtained with the apparatus described and heated electrically using rods 22 of silicon carbide.

The two tubes 5 and 7 present the advantage over any other form of apparatus of being conveniently fed and of being fixed above and below ash-pits 3 and 9. The hopper 6 is fixed to the tubes 5 and 7 through the medium of stuffing boxes.

It is evident that the apparatus might comprise any number of tubes placed in parallel and that these might be replaced by chambers of different shape.

I claim:

In apparatus for treating producer gas, a pair of elongated tubular members forming chambers arranged to extend vertically adjacent each other, a grate arranged for movement within each of said chambers to support a column of carbonaceous material above each grate, means for heating the carbonaceous material supported on each grate, a lever having the intermediate portion thereof pivotably mounted adjacent one end of the chambers and a rod pivotally attached to each end of said lever, each rod extending into a chamber and attached to the grate arranged therein so as to support each grate whereby said grates are simultaneously moved by the oscillation of said lever on the mounting pivot thereof.

LEON SAIVES.